United States Patent Office 2,886,430
Patented May 12, 1959

2,886,430

URANIUM COMPOSITIONS

Norman Percy Allen and John Douglas Grogan, Teddington, England, assignors, by mesne assignments, to the United States of America as represented by the United States Atomic Energy Commission No Drawing. Application February 26, 1948
Serial No. 11,335

6 Claims. (Cl. 75—122.7)

This invention relates to uranium metal and has the object of providing compositions predominantly of uranium and having regulated physical properties with low competitive absorption of thermal neutrons. A low energy nuclear reacting pile was described at a Nuclear Physics Conference held at Montreal, Canada, on September 5, 1946, the pile comprising uranium rods cased in aluminum and suspended in heavy water contained in an aluminum vessel. The pile was useful for activating materials for tracer work and as a source of thermal neutrons for experiments in nuclear physics. See National Research Council of Canada, Report PD207.

In order to produce uranium metal in a form most efficient for use in a pile, effort has been largely directed over a period of years to removing as far as possible all impurities and particularly those elements having a large competitive absorption of neutrons. In the result extremely pure uranium metal has been produced with an impurity content of less than 0.1 percent by weight and of competitive absorption less than approximately 0.2 percent. It has been found however that in the case of extremely pure metal, the physical and mechanical properties become irregular. In particular, the coefficient of linear expansion in the $\alpha$ state may vary from sample to sample over a range from $-0.3 \times 10^{-5}$ per degree centigrade to $3.0 \times 10^{-5}$ and similar changes occur in other properties such as electrical and thermal conductivity, tensile strength and elongation. Moreover these properties are liable to change in a sample after successive heat cycles involving temperatures above the first transition temperature and the values obtained with the recooled sample cannot be predicted and tend to vary in different directions through the sample. (It is known that uranium metal when raised in temperature passes through two transitions in crystal structure. The first transition, that is, from the $\alpha$ state stable at normal temperatures to the $\beta$ state, occurs between 750° and 780° C. and the second, that is from the $\beta$ state to the $\gamma$ state occurs in the region of 800° C. On cooling, transitions occur in reverse sequence in the same temperature regions.)

The irregularities in the characteristics of extremely pure uranium metal render such metal liable to excessive distortion on repeated heating and cooling and make the physical behaviour of the metal incapable of calculation.

We have found that the addition of small quantities of certain elements of small neutron-capture cross-section to extremely pure uranium metal has the effect of substantially eliminating the irregularities above referred to, without seriously increasing the competitive neutron absorption, and such addition provides a uranium metal of uniform and reproducible characteristics substantially unaffected by repeated heating and cooling, and which also has a low competitive neutron absorption. Hence in accordance with the invention a method of reducing or substantially eliminating irregularities in physical and mechanical properties of extremely pure uranium comprises adding to the uranium an alloying element or elements of small neutron capture cross-section in small amount insufficient to introduce substantial increase in competitive neutron absorption.

Elements which may be added to the extremely pure uranium are aluminium, silicon, phosphorus, tin, lead, bismuth, niobium, and zinc. The amount to be added to achieve the reproducible characteristics is not less than 0.05% if but one element is added, and not less than a total amount of 0.05% if two or more of the elements are introduced so as to be present simultaneously in the metal.

Furthermore the amount added should be such as to increase the total competitive absorption by not more than 0.1% and preferably by less than 0.05%. The maximum amounts by weight, that is, the amounts producing an increase of 0.1% in competitive absorption are shown in the table below. The table also shows the preferred amounts to be added to a sample of uranium with a competitive absorption of 0.20%, to yield a product of reproducible characteristics.

|  | Maximum, percent | Preferred, percent |
|---|---|---|
| Aluminium | 0.37 | 0.1 |
| Silicon | 0.36 | 0.1 |
| Phosphorus | 0.32 | 0.1 |
| Tin | 0.56 | 0.1 |
| Lead | 4.0 | 0.1 |
| Bismuth | 4.0 | 0.1 |
| Niobium | 0.15 | 0.07 |
| Zinc | 0.17 | 0.08 |

In stating amounts by weight responsible for specific increases in competitive absorption, we make use of currently accepted values of capture cross section for thermal neutrons. In practice the addition in the stated amount can be achieved and estimated only to a limited degree of accuracy and practical tolerances arising in this way are in general of first significance. Limiting and preferred amounts are thus specified to such practical tolerances.

Any one or any group of the specified elements may be added in proportion to increase the competitive absorption to the specified extent. In some cases where more than one element is added, the added elements may be initially in chemical combination.

We find for example that if 0.1% of aluminium be added to extremely pure uranium having a competitive absorption of 0.23%, the physical properties of the metal are rendered uniform and reproducible, and the total competitive absorption becomes not greater than 0.26%. If an effort be made to secure the same improvement by the addition of an element, such as iron, not in the above-listed group, the weight addition has to be of the same order resulting in a total competitive absorption of an objectionable value of the order of 0.37%.

In carrying out the invention the added element or elements may be incorporated by melting them in elementary form, or as alloys or compounds which under the conditions of melting will yield the said elements, with the extremely pure uranium in a vessel which may be of graphite, thoria, alumina, beryllia, magnesia or other material which will not contaminate the uranium. The alloying process is carried out under conditions preventing oxidation or reduction, for example by effecting the melting in a flux of barium chloride or in a non-reactive atmosphere or at low pressure.

A single melting has been found adequate to ensure uniform distribution of the added element but the melting may if desired be repeated to improve the distribution. The molten product may be cast directly into moulds.

The addition may alternatively be effected by allowing the additional element or elements to diffuse into the uranium metal in the solid state, or by adding the desired element to the charge when the uranium is being reduced, or by any other method which does not result in the absorption by the uranium of undesired elements of large competitive absorption.

It is believed that the action of the added element or elements is to limit crystal-growth in the uranium in cooling through the first transition region, but the invention does not depend upon the accuracy of this explanation. It is found that the variations in expansion are due to differences in expansion along the crystal axes, that samples of highly pure metal develop large crystals on cooling to the α state and that particular orientations of the crystal axes along a sample rod are associated with particular coefficients of linear expansion of the rod. When a sample rod is heated, recrystallisation occurs at the transition into the β state and as the sample cools another recrystallisation occurs at the transition back to the α state. Such recrystallisation usually involves a new orientation of the crystals and hence in pure metal new values of coefficients of expansion of the sample under test. The presence of certain elements alloyed in small proportion with uranium apparently leads to a refinement of grain in the crystallisation into the α state and to the development of small crystals of random orientation so that the product has coefficients of expansion which are the same in all directions through the mass and are unchanged after successive similar heat cycles.

We find that the addition of elements in accordance with the invention in amount as little as 0.05% by weight has a significant effect when the uranium has been so purified that its competitive absorption has the necessary low value.

The invention in another of its aspects resides in a process for the manufacture of uranium of low competitive neutron absorption and substantially uniform and reproducible physical characteristics, which comprises subjecting uranium in the molten state to high vacuum whereby to remove impurities volatile under such conditions and subsequently adding to the molten uranium under higher pressure an alloying element or elements in amount sufficient to produce grain refinement but insufficient to cause substantial increase in competitive neutron absorption.

The effect of the vacuum heat treatment is the substantial elimination of easily distilled impurities such as manganese, tin, copper, calcium, magnesium and nickel, also of gaseous impurities such as hydrogen and nitrogen thereby effectively reducing competitive neutron absorption by impurities; the effect of the second stage of heat treatment is to restore in the cooled product the reproducible expansion characteristics destroyed by the first stage.

The invention also consists in a uranium alloy having an impurity content of less than 0.1 percent by weight and containing not less than 0.05 percent by weight of at least one element of the group consisting of aluminium, silicon, phosphorus, tin, lead, bismuth, niobium, and zinc, the balance being uranium, the said alloy having a total competitive neutron absorption not exceeding 0.3 percent.

The uranium metal product may be rolled and otherwise worked without detriment to the reproducibility of the physical properties although some processes of working may produce an anisotropy of a uniform and predictable character.

In the present specification the expression "extremely pure uranium" means uranium metal having an impurity content of less than 0.1 percent by weight and "substantial increase in competitive neutron absorption" means an increase in the total competitive neutron absorption (expressed as a percentage) exceeding 0.1.

We claim:
1. The method of reducing or substantially eliminating irregularities in the physical and mechanical properties of uranium having an impurity content of less than 0.1 percent by weight to render it suitable for use in a nuclear reactor, which comprises incorporating in the uranium while in the molten state at least one alloying element of small neutron capture cross-section in an amount which is not less than 0.05 percent by weight of the uranium and which is insufficient to cause an increase exceeding 0.1 in the total competitive thermal neutron absorption expressed as a percentage.

2. The method of reducing or eliminating irregularities in the physical and mechanical properties of uranium having an impurity content of less than 0.1 percent by weight to render it suitable for use in a nuclear reactor, which comprises incorporating in the uranium while in the molten state at least one element of the group consisting of aluminium, silicon, phosphorus, tin, lead, bismuth, niobium, and zinc in an amount which is not less than 0.05 percent by weight of the uranium but is insufficient to introduce increase exceeding 0.1 in the total competitive thermal neutron absorption expressed as a percentage.

3. The method according to claim 2 wherein the amount of added element or elements is 0.1 percent by weight.

4. Uranium alloy, suitable for use in a nuclear reactor, having an impurity content of less than 0.1 percent by weight and containing not less than 0.05 percent by weight of at least one element of the group consisting of aluminium, silicon, phosphorus, tin, lead, bismuth, niobium and zinc, the balance uranium, the said alloy having a total competitive neutron absorption not exceeding 0.3 percent.

5. The method of reducing or substantially eliminating irregularities in the physical and mechanical properties of uranium having an impurity content of less than 0.1 percent by weight and having a melting point of 1130° C. to render it suitable for use in a nuclear reactor, which comprises the step of heating the said uranium to melt the same, incorporating therein at least one alloying element of small thermal neutron cross-section in an amount which is not less than 0.05 percent by weight of the uranium and which is insufficient to cause more than a 0.1 percent increase in competitive thermal neutron absorption and allowing the molten uranium to cool.

6. Uranium metal having an impurity content of less than 0.1 percent by weight and containing at least one element of the group consisting of aluminium, silicon, phosphorus, tin, lead, bismuth, niobium and zinc, in total amount of from 0.05 to 0.1 percent by weight.

References Cited in the file of this patent

UNITED STATES PATENTS

| Number | Name | Date |
|---|---|---|
| 1,306,568 | Weintraub | June 10, 1919 |
| 1,433,403 | Mueller et al. | Oct. 24, 1922 |
| 1,648,954 | Marden | Nov. 15, 1927 |
| 1,648,962 | Rentschler et al. | Nov. 15, 1927 |
| 1,728,942 | Marden | Sept. 24, 1929 |
| 2,446,780 | Newton | Aug. 10, 1948 |

FOREIGN PATENTS

| 230,865 | Great Britain | Dec. 10, 1925 |
|---|---|---|

OTHER REFERENCES

Aufbau der Zweistofflegierungun, by M. Hausen, 1936, pages 160, 384, 976, 1072.

Business Week, September 1, 1945, pp. 57–63.

Chipman: U.S. Atomic Energy Commission Document MDDC–539, "Metallurgy in the Development of Atomic Power," manuscript dated October 1946, declass. November 25, 1946, 20 pp.; note especially pages 12–15.

Beckerly: Nucleonics, vol. 12, No. 4, April 1954, p. 15.